(12) United States Patent
Hannigan

(10) Patent No.: US 6,513,717 B2
(45) Date of Patent: Feb. 4, 2003

(54) INTEGRATED CURSOR CONTROL AND SCANNER DEVICE

(75) Inventor: Brett T. Hannigan, Portland, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/733,005

(22) Filed: Dec. 7, 2000

(65) Prior Publication Data

US 2002/0070277 A1 Jun. 13, 2002

(51) Int. Cl.[7] ................................................ G06K 7/10
(52) U.S. Cl. ..................... 235/462.45; 235/472; 235/380
(58) Field of Search ............................ 235/462.45, 472, 235/380

(56) References Cited

U.S. PATENT DOCUMENTS

| | | | |
|---|---|---|---|
| 4,804,949 A | * 2/1989 | Faulkerson | ............. 235/472 X |
| 5,448,050 A | 9/1995 | Kostizak | |
| 5,574,804 A | 11/1996 | Olschafskie et al. | |
| 5,633,489 A | * 5/1997 | Dvorkis et al. | ............. 235/472 |
| 5,635,697 A | 6/1997 | Shellhammer et al. | |
| 5,726,685 A | 3/1998 | Kuth et al. | |
| 5,909,209 A | 6/1999 | Dickinson | |
| 5,994,710 A | 11/1999 | Knee et al. | |
| 6,036,094 A | * 3/2000 | Gouldman et al. | .... 235/462.45 |
| 6,164,534 A | * 12/2000 | Rathus et al. | ................ 235/380 |
| 6,311,214 B1 | 10/2001 | Rhoads | |

FOREIGN PATENT DOCUMENTS

JP            16410 A    * 6/1999

OTHER PUBLICATIONS

U.S patent application Ser. No. 09/342,688, Rodriguez et al., filed Jun. 29, 1999.

U.S. patent application Ser. No. 09/343,101, Davis et al., filed Jun. 29, 1999.

U.S. patent application Ser. No. 09/342,971, Rodriguez et al., filed Jun. 29, 1999.

U.S. patent application Ser. No. 60/158,015, Davis et al., filed Oct. 6, 1999

U.S. patent application Ser. No. 09/534,125, Hannigan, filed Apr. 5, 2000.

U.S. patent application Ser. No. 09/571,422, Rhoads et al., filed May 15, 2000.

U.S. patent application Ser. No. 09/679,261, Davis et al., filed Oct. 4, 2000.

U.S. patent application Ser. No. 09/679,262, Rhoads, filed Oct.4, 2000.

* cited by examiner

Primary Examiner—Karl D. Frech
Assistant Examiner—Allyson Sanders
(74) Attorney, Agent, or Firm—Joel R. Meyer; Digimarc Corporation

(57) ABSTRACT

An integrated optical cursor control—image capture device and related applications. An integrated optical cursor control and scanner device includes an image sensor used to capture instances of image data from which direction of movement of the device can be derived for controlling position of a cursor. In addition, the image sensor captures instances of image data from which a composite image comprised of image samples from the instances of image data can be constructed for image scanning applications.

14 Claims, 5 Drawing Sheets

INTEGRATED CURSOR CONTROL AND SCANNER DEVICE

RELATED APPLICATION DATA

This patent application is related to U.S. patent applications Nos. 09/543,125 entitled Internet-Linking Scanner, filed Apr. 5, 2000, by Brett T. Hannigan, 60/158,015 entitled Data Entry Method and System, filed Oct. 6, 1999 by Bruce Davis, Scott Carr, Geoff Rhoads and Phil Patterson, and 09/343,101 entitled Enhanced Input Peripheral, filed Jun. 29, 1999, by Bruce Davis, Geoff Rhoads and Phil Seder, which are hereby incorporated by reference. This patent application is also related to U.S. patent applications Nos. 09/679,261 filed Oct. 4, 2000 by Bruce Davis, Geoff Rhoads, Scott Carr and Phil Patterson and 09/679,262 filed Oct. 4, 2000 by Geoff Rhoads, which claim the benefit of No. 60/158,015.

TECHNICAL FIELD

The invention relates to imaging devices and input devices.

BACKGROUND AND SUMMARY

There are a variety of applications of digital imaging sensors such as CCD and CMOS sensors. One application is document or other still image scanning. Another application is video capture. Yet another is cursor control for graphical displays on computers.

An optical mouse is type of cursor control device for computers. It enables users to position a cursor in a graphical display. It has image sensor arrays that capture instances of image samples of a surface under the mouse as the mouse moves over that surface. To control cursor movement, a software driver for the device calculates the relative change in position of the mouse by correlating image samples from successive instances of image samples captured by a sensor array. See for example, U.S. Pat. No. 4,631,400.

The invention provides an integrated cursor control—image capture device and related applications. One aspect of the invention is an integrated optical scanner and cursor control device. This device includes an image sensor used to capture instances of image data from which direction of movement of the device can be derived for controlling position of a cursor. In addition, the image sensor captures instances of image data from which a composite image comprised of image samples from the instances of image data can be constructed.

Another aspect of the invention is an integrated optical scanner and cursor control device comprising a linear image array for capturing an image of an object as the device is moved over the object; one or more image sensors for detecting x-y position of the device; and a light source for illuminating a surface below the device. In one implementation, these elements are enclosed in a computer mouse shaped enclosure. The device is in communication with a processor that correlates the image data captured in one (or more) of the image sensors to determine the relative position of image data captured as the user moves the device over a surface. The processor uses correlation to determine x-y positioning of the device for cursor control and for stitching together images from the linear array to create a two dimensional image scan.

Further features will become apparent with reference to the following detailed description and accompanying drawings.

DETAILED DESCRIPTION

Figure 1:
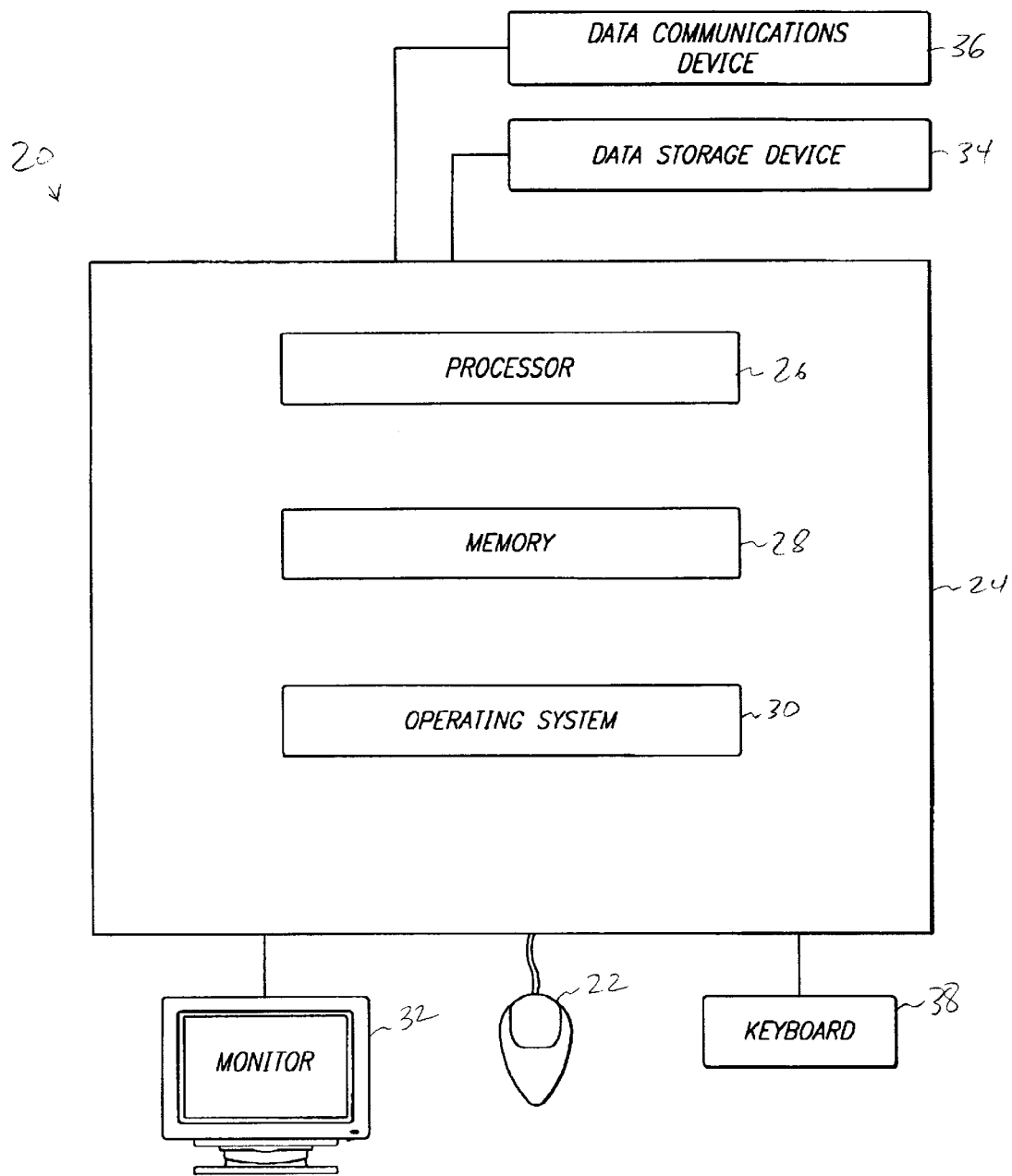
FIG. 1 illustrates a system diagram of a computer system, which serves as an operating environment for an integrated optical mouse and scanner device.

FIG. 1 illustrates a system diagram of a computer system 20, which serves as an operating environment for an integrated optical mouse and scanner device 22. The system comprises a computer 24 (e.g., Personal Computer, set-top box, personal digital assistant, Internet appliance, etc.) that has a processor 26 (e.g., Central Processing Unit), memory 28 (e.g., Random Access Memory, Read Only Memory, etc.) and software (e.g., operating system 30 and application programs) executed from the memory by the processor. The system also has a number of peripherals, including the integrated mouse-scanner 22, a display monitor 32, data storage device 34, such as optical and magnetic storage devices (e.g., a hard drive, Zip drive, floppy drive, CD ROM drive, DVD drive, etc.), data communications device 36 (wire or wireless modem, infrared transceiver, network adapter, Bluetooth transceiver, etc.), and keyboard 38. Software or firmware for controlling the integrated mouse-scanner may reside within the scanner itself, in the computer, data storage or other computer readable media. Processing of this software may be distributed between the scanner (e.g., code running on an embedded processor in the scanner) and the computer (code running on the processor 26). To simplify the scanner device, the control software is preferably implemented within a software driver executing in the host computer.

Figure 2:
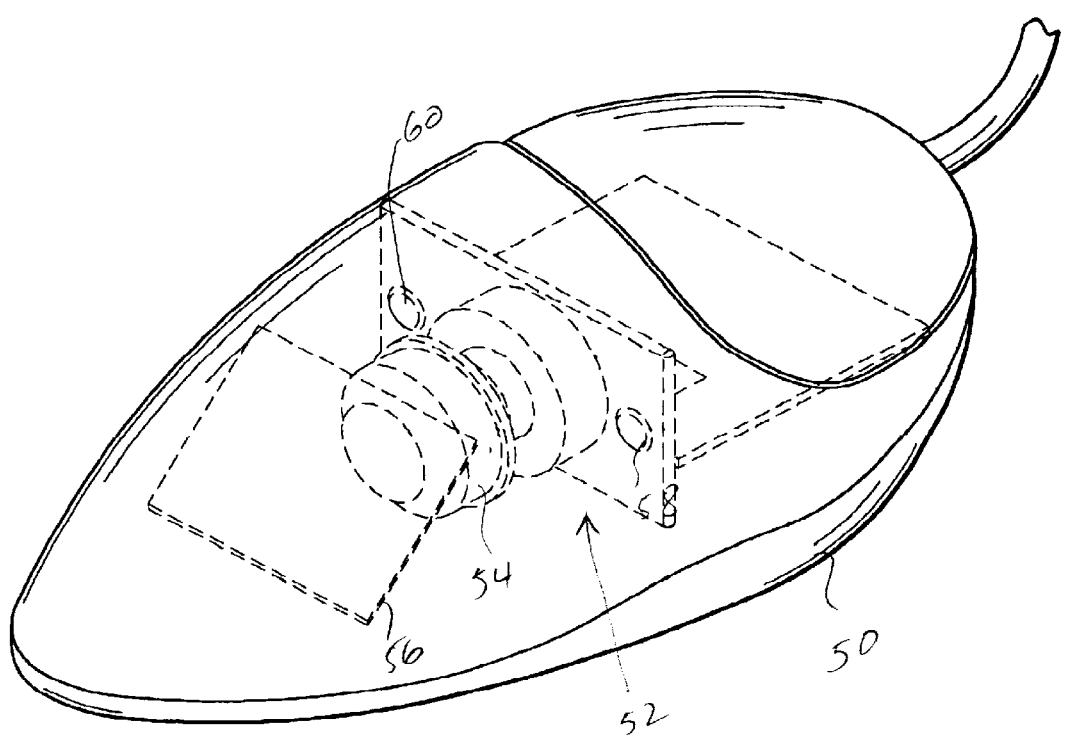
FIG. 2 is a diagram of an implementation of a combined scanner and optical mouse device.

FIG. 2 is a diagram of an implementation of a combined scanner and optical mouse device. The device includes a plastic enclosure 50 in the shape of a computer mouse. Like a computer mouse, the enclosure is shaped to fit within the palm of the user's hand. In addition, it has a flat bottom surface that keeps the device steady as it slides over substantially planar surfaces like a desk or table top. Within this enclosure, the device includes a CMOS camera 52, which includes a lens 54 and two-dimensional CMOS array. The CMOS camera used in this implementation is a Xirlink IBM PC Camera distributed by IBM Corporation, which includes an Agilent CMOS image sensor.

The lens 54 of the CMOS camera faces a mirror 56 that reflects light from the surface under the mouse back into the lens. In addition, the device includes light sources 58, 60 that illuminate the surface under the mouse enclosure. In this implementation, the light sources are Light Emitting Diodes. Alternative light sources may be used as well. As shown in FIG. 2, the light sources are positioned behind the lens and are directed at the mirror, which in turn reflects the light to the surface below the mouse enclosure. Alternatively, the light sources may be directed at the surface below the mouse enclosure directly rather than reflecting light to the surface using the mirror.

Operating under the control of software executing in the host computer (FIG. 1), the integrated mouse scanner operates in one of two different modes: 1) optical mouse mode; or 2) optical scanner. In the first mode, the CMOS array captures two dimensional images of the surface under the mouse and passes them to the software driver in the computer. The computer buffers most recently received frames and performs correlation between blocks of image samples in successive frames to determine motion vectors that describe the change in position of the device from one frame to the next. These motion vectors describe the relative change in position of the cursor on the display monitor of the computer system.

In the second mode, the computer buffers image frames from the camera and uses correlation operations to stitch successive frames together to form a composite image. The user swipes the mouse over an image to be scanned on a planar surface under the mouse. A typical application is scanning a paper document under the mouse. While doing so, the user presses a button on the mouse, which causes the devices to signal the software driver that image capture is active. By matching up overlapping portions of successive image frames, the driver software determines the relative orientation and translation from one frame to the next. It then merges the overlapping portions and concatenates non-overlapping portions of the image frames to create a composite image.

Figure 3:
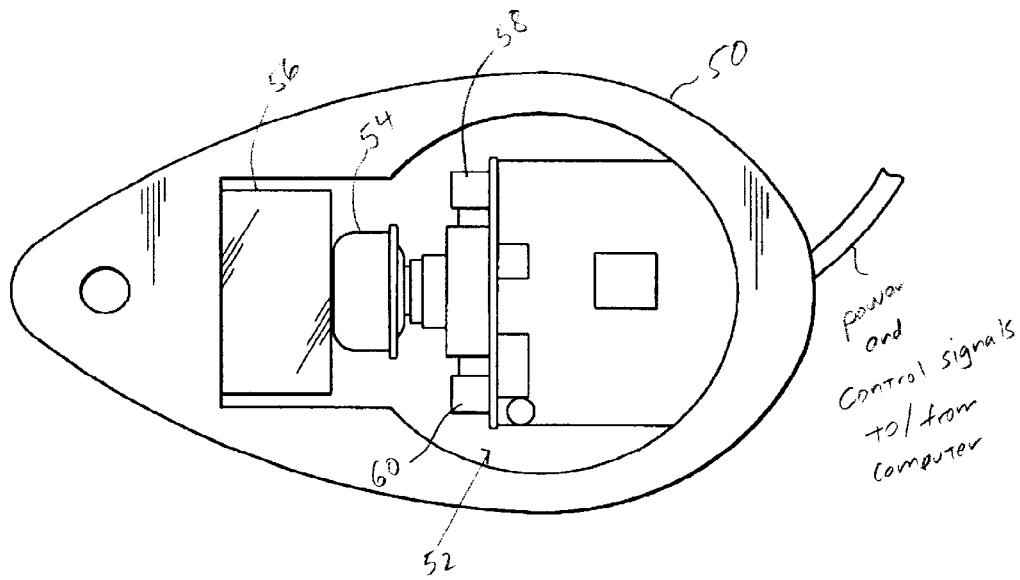
FIGS. 3 and 4 show alternative views of the integrated optical mouse and scanner of FIG. 2.
Figure 4:
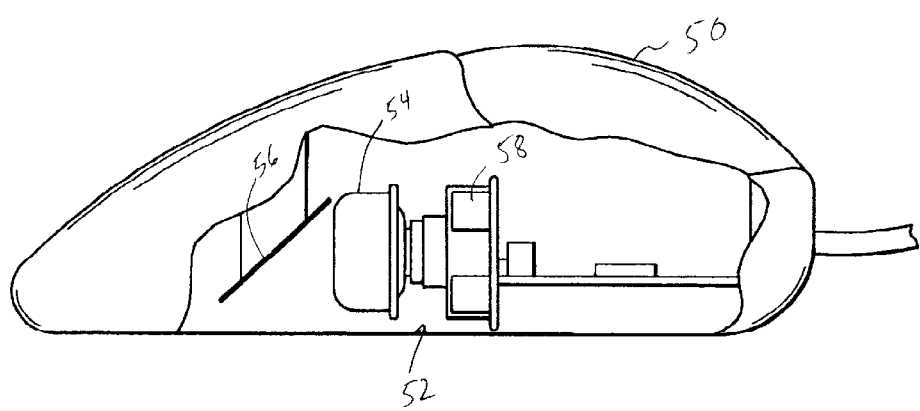

FIGS. 3 and 4 show alternative views of the integrated optical mouse and scanner of FIG. 2.

Figure 5:
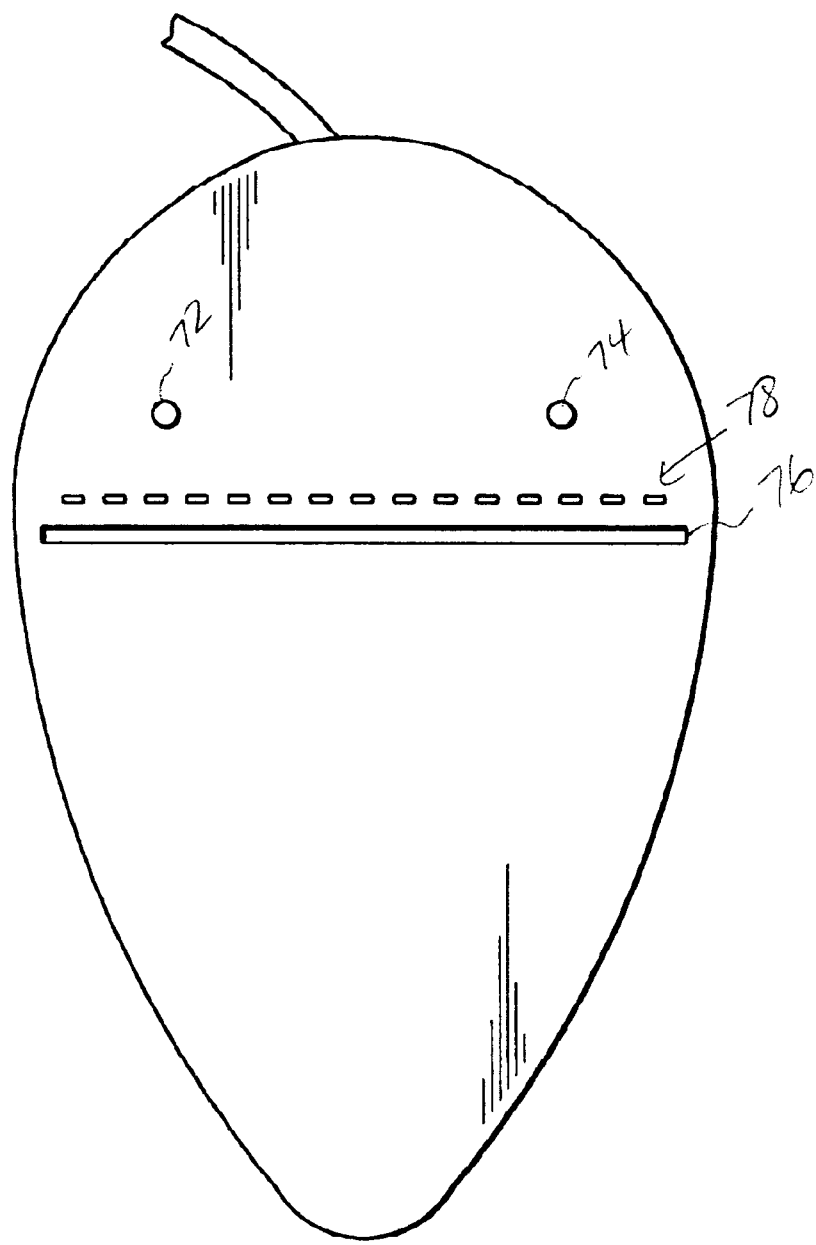
FIG. 5 is a diagram of an alternative implementation of an integrated optical mouse and scanner.

FIG. 5 is a diagram of an alternative implementation of an integrated optical mouse and scanner. Within a plastic mouse shaped enclosure 70, this device includes two small image sensors 72, 74 (16 by 16 CCD or CMOS array) with a fast frame rate (1000 frames per second) positioned near each end of a wider linear image sensor array 76 (perhaps lower scan rate). The small, fast sensors generate images from which controller software executing on the host computer calculates relative position and orientation of successive frames. In addition to the image sensors, the device includes an array of light sources 78 to illuminate the image being scanned under the mouse.

The wider sensor 76 captures images for document scanning and watermark decoding. The x-y positioning function enables the controller software to stitch together image data from the linear sensor into two dimensional images. Like the device illustrated in FIGS. 2–4, this device functions as both an optical mouse and an image scanner (including image scanning capable of generating images for digital image watermark decoding (see below), bar code reading, etc.). The image scanning mode of this device operates like the Capshare hand held scanner from Hewlett Packard. In addition, one of the smaller image sensors 72, 74 is used to determine x-y relative position of the mouse to control the position of a cursor on a display, as described in the alternative embodiment above.

While the device shown in FIG. 5 operates like hand held scanners like the Capshare scanner from Hewlett Packard, it has a number of additional novel features. For instance, it houses the sensors in a mouse enclosure that rides over substantially planar surfaces, scanning images of objects under the mouse. Since the images are transferred to the host computer, the image processing operations are offloaded to the computer's processor, decreasing the computational complexity of the device. In addition, the design moves image storage requirements to the computer, eliminating the need for device specific memory.

The device provides additional functionality. It uses one of the two image sensors that calculate movement to measure mouse movement and move a cursor etc., using conventional optical mouse technology.

Figure 6:
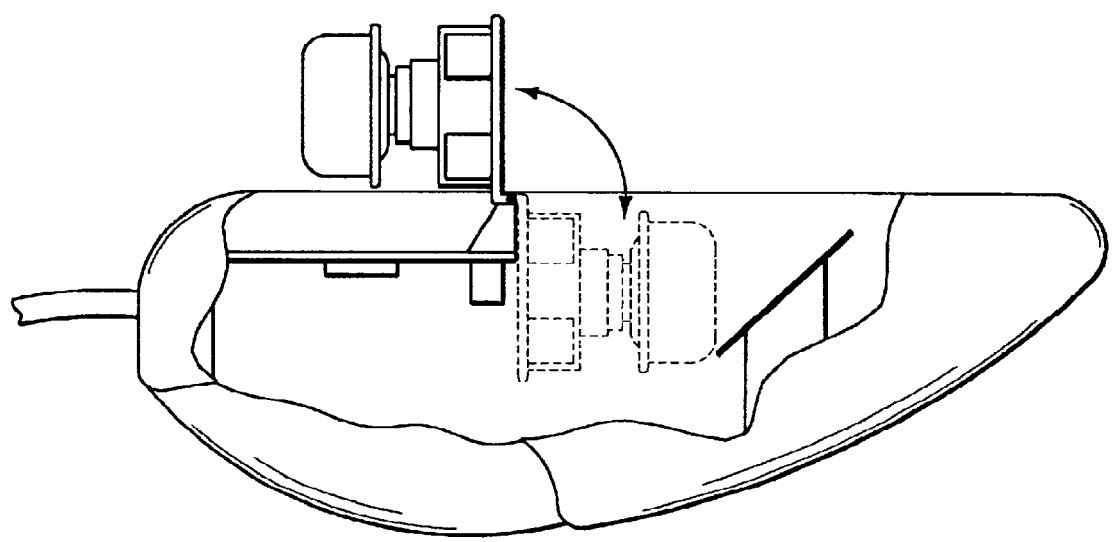
FIG. 6 shows a variation of the device in FIGS. 2–4 that enables it to act as a video camera.

FIG. 6 shows a variation of the device in FIGS. 2–4 that enables it to act as a video camera. This device operates as video a camera for applications like video conferencing by flipping the mouse upside down, and folding out the camera. The image sensor is mounted on a hinge that enables the sensor to mechanically extend from within the enclosure. In addition, the enclosure is shaped so that when the sensor is extended outside the enclosure, the other side of the enclosure forms a stable base for the device to rest on the surface of a desk, computer monitor, or other object. The enclosure may also include a clip or other like fastener to mount the base onto an object such as a computer monitor for video teleconferencing applications. In sum, the device acts as a cursor positioning device, document scanner, and video camera.

The optical scanner devices described above may be implemented in alternative ways. One design option is to make the device a wireless device that communicates control and image data to a host computer via a wireless connection such as infrared or Bluetooth communication links. Another design option is to include a processor and memory in the device that provides functionality such as the ability to capture and store images for later transfer to a computer, either through a docking station or a wireless connection. For example, the device can operate in tethered and un-tethered mode. In un-tethered mode, the device operates as a scanner that can collect a number of images. In tethered mode, the device can transfer images to a host device, such as a PC.

The optical devices need not have multi-mode functionality in all implementations. For example, the optical scanner may operate as just a scanner or just a cursor control device. The scanner may be used in forensic analysis applications, where it captures images of objects, and then transfers these images to a computer for further analysis, such as digital watermark decoding for copy detection and authentication.

Embedding and Reading Digital Watermarks

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference.

The scanner devices described above may be used to scan images of watermarked objects, such as watermarked images printed on documents. When used in conjunction with digital image watermark decoder software or hardware, the scanner devices may be used as watermark readers.

In order to make the image watermark readable by the above devices, it may be necessary to alter the watermark embedding process. In particular, the watermark embedding process embeds a watermark image signal at a spatial image resolution that enables the decoder to read the watermark from an image scanned from close distance (e.g., less than one inch). Since the image scanners are likely to scan images placed on surfaces below a mouse, the watermark needs to be embedded at a suitably high resolution. However, embedding at such a resolution may make it impractical to read the watermark from images scanned at larger distances (e.g., 4–7 inches) from other types of imaging devices, such as web cameras and scanners.

One way to address this challenge is to embed the watermark signal at two or more different resolutions of a host image. Then, a variety of imaging devices may be used to read the watermark from a printed image. One way to embed at two or more different spatial image resolutions is to embed a first spatial image watermark at a first resolution (e.g., 600 dpi) for reading at close distances (e.g., less than one inch) and embed a second spatial image watermark at a second spatial resolution (e.g., 100 dpi) for reading at distances compatible with web cams (e.g., 4–7 inches).

For each watermark to be embedded, the embedder adjusts the resolution of the watermark signal by creating a spatial image watermark signal at a desired resolution. In particular, the embedder generates a watermark signal by spreading a binary message over a pseudorandom number, mapping the resulting elements of that number to discrete spatial image locations within an image block at a target resolution, and perceptually adapting the gain applied to each element according to the host image data at the target resolution. The resulting perceptually adapted watermark image is added to the host image. For examples of watermarking techniques, see co-pending application Ser. No. 09/503,881 and U.S. Pat. No. 5,862,260.

To encode a second watermark at a different resolution, the embedder repeats the process at a different resolution, taking the watermarked image as input and creating a watermarked image with watermarks readable at two different resolutions.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the image processing operations may be implemented in a programmable computer or a special purpose digital circuit. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. An integrated optical scanner and cursor control device comprising:

an image sensor used to capture instances of image data from which direction of movement of the device can be derived for controlling position of a cursor, and from which a composite image comprised of image samples from the instances of image data can be constructed; wherein the image sensor is operable to mechanically extend from within an enclosure for use as a video camera.

2. The device of claim 1 wherein the image sensor is a two dimensional image array.

3. The device of claim 1 wherein the image sensor is enclosed within a mouse-shaped enclosure, and is positioned to capture images of an object as the mouse shaped enclosure is passed over the surface of the object.

4. The device of claim 1 including a light source for illuminating a surface below the device.

5. The device of claim 1 in communication with a processor for analyzing the instances of image data to determine movement of the device for cursor control and for concatenating image samples from the instances of image data to create the composite image.

6. The device of claim 5 wherein the processor is operable to perform correlation between instances of the image data to determine direction of movement of the device for positioning a cursor.

7. The device of claim 5 wherein the processor is operable to perform correlation between instances of the image data to determine relative position of sets of image data and is operable to use the relative position to concatenate the instances of image data to create the composite image.

8. The device of claim 7 wherein the processor is operable to perform correlation between instances of the image data to determine direction of movement of the device for positioning a cursor.

9. An integrated optical scanner and cursor control device comprising:

a linear image array for capturing an image of an object as the device is moved over the object;

one or more image sensors for detecting x-y position of the device, where at least one of the image sensors is used to determine positioning of a cursor for a graphical user interface;

a light source for illuminating a surface below the device; and a processor programmed to read a digital watermark from the image of the object that has been embedded in the object by spreading a message with a pseudo-random number to form an intermediate signal, combining the intermediate signal with a host image and applying the host image to the object.

10. The device of the claim 9 wherein the linear image array, one more image sensors and light source are enclosed in a mouse shaped enclosure.

11. The device of claim 9 in communication with a processor for forming a two dimensional image by combining image data from the linear image array and using the one or more image sensors for detecting x-y position to determine relative position of the image data for stitching the image data together into a two dimensional image scan.

12. The device of claim 1 further including:

a processor programmed to read a digital watermark from the composite image of an object that has been embedded in the object by spreading a message with a pseudo-random number to form an intermediate signal, combining the intermediate signal with a host image and applying the host image to the object.

13. The device of claim 1 wherein the processor is operable to decode a watermark at a first spatial resolution when the image sensor is positioned for use as a video camera, and is operable to decode a watermark at a second spatial resolution when the image sensor is positioned for use as a hand held scanner.

14. The device of claim 13 herein the processor is operable to decode a watermark at a first spatial resolution when the image sensor is positioned for use as a video camera, and is operable to decode a watermark at a second spatial resolution when the image sensor is positioned for use as a hand held scanner.

* * * * *